UNITED STATES PATENT OFFICE.

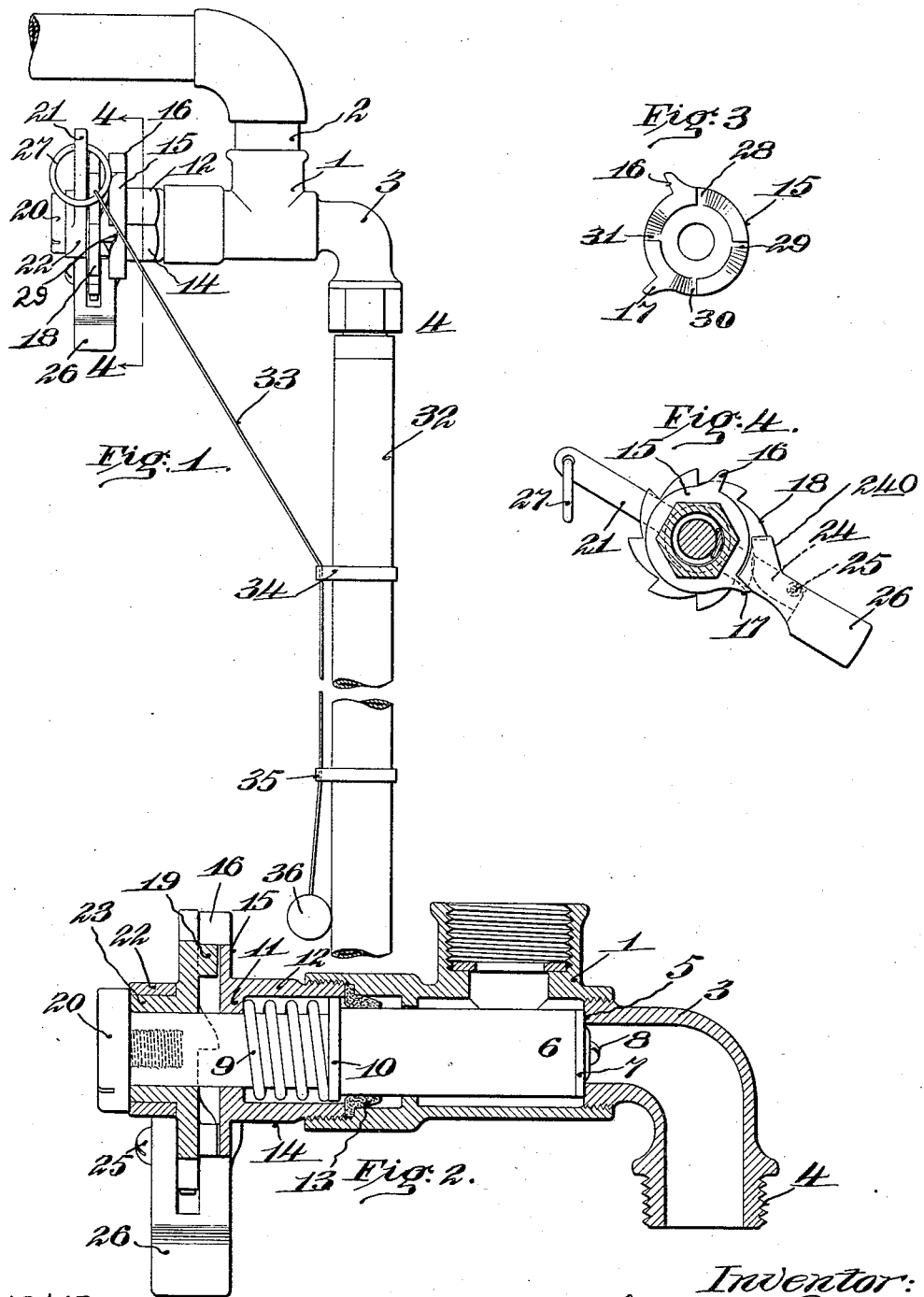

SAMUEL G. BROWN, OF LYNN, MASSACHUSETTS.

FAUCET.

1,055,704.  Specification of Letters Patent.  Patented Mar. 11, 1913.

Application filed January 27, 1912. Serial No. 673,822.

*To all whom it may concern:*

Be it known that I, SAMUEL G. BROWN, a citizen of the United States, residing at Lynn, in the county of Essex and State of Massachusetts, have invented certain new and useful Improvements in Faucets; and I do hereby declare the following to be a full, clear, and exact description of the invention, such as will enable others skilled in the art to which it appertains to make and use the same.

The present invention relates to an improvement in faucets.

The object of the invention is to reorganize and improve the construction of faucets, and more particularly in order to produce a faucet which may be turned on and off with a simple pull upon a cord attached to it or by a pull upon the hose leading from the faucet.

To the above end the present invention consists in an improved faucet hereinafter described and particularly defined in the claim.

In the accompanying drawings illustrating the preferred form of the invention; Figure 1 is a side elevation of the faucet showing its connections with the supply and delivery pipes; Fig. 2 is a sectional elevation; Fig. 3 illustrates a detail of the construction; and Fig. 4 is a section taken on the line 4—4, Fig. 1, looking in the direction of the arrows.

The illustrated embodiment of the invention is described as follows:

The main valve body 1 is adapted to be screwed on a supply pipe 2 and consists of a valve chamber having an opening in one side, for convenience the top. This valve chamber is provided at one end with an outlet 3 having a threaded hose end 4. The outlet member 3 is provided with a seat 5 with which the plunger 6 engages to shut off the water. The plunger is provided on its end with the usual washer 7 secured by the screw 8. The valve is opened and closed by lifting the plunger off its seat. A spring 9 encircling the stem of the plunger engages a flange 10 on the plunger at one end and the shoulder 11 on the spring socket 12 at the other. The spring socket 12 is screwed into the end of the valve body 1 and clamps between its end and the valve body the packing ring 13. It will be observed that the packing ring, made of leather, has a lip which is nipped between the end of the spring socket member and the valve chamber so as thereby to secure a tight fit to this joint and that the packing ring 13 has a laterally turned lip which lies against the cylindrical surface of the plunger. This lip is held in tight engagement with the plunger by the pressure of water upon the outside thereof. The spring socket 12 is provided with a hexagonal surface 14 adapted to be engaged by a wrench so that it may be screwed tightly into the valve chamber. It is also provided with a flange 15 which is provided with stops 16 and 17 for the purpose hereinafter described. Upon one side of the flange 15 there are provided four cavities or notches 28, 29, 30 and 31 adapted to receive cam projections hereinafter referred to.

A ratchet wheel 18 is mounted upon the stem of the plunger and is provided with eight ratchet teeth upon its periphery and with two cam projections 19 which drop in the cavities or notches 28, 29, 30 and 31 when the valve is closed. When the ratchet wheel is turned so as to slide the cams 19 up out of the cavities or notches 28, 29, 30 and 31, the ratchet wheel is moved bodily to the left, thereby pulling the plunger from its seat, the ratchet wheel being held on the plunger by the screw 20. For turning the ratchet wheel a lever 21 having a hub 22 which fits over the hub 23 of the ratchet wheel is employed. This lever is provided with a pawl 24 pivoted at 25 upon the lever. The lever is weighted at 26 so that it normally occupies the position illustrated in Fig. 4. When, however, the other end of the lever provided with a ring 27 is pulled downward, the pawl engages one of the teeth of the ratchet wheel 18 and turns the ratchet wheel an eighth of a turn, thereby causing the cams 19 to rise up out of the cavities or notches 28, 29, 30 and 31 and to pull the plunger away from its seat. The weight 26 on the lever restores it to its normal position. A second pull on the lever turns it through another eighth of a revolution and permits the projections 19 to drop into the next pair of cavities or notches 28, 29, 30 and 31 so as thereby to permit the plunger to be pressed by the spring 9 to its seat to close the faucet. The stops 16 and 17 limit the oscillations of the lever 24 by limiting the movement of a projection 24 on the lever which lies between the two projections 16 and 17 of the flange 15. Fig. 3 is a view of the flange 15, the four cavities or notches 28, 29, 30 and 31 being adapted to coöperate in pairs with the two projections 19 on the face of the ratchet wheel.

If desired, the hose 32 connected with the outlet 4 of the faucet may be directly connected with the lever 21 so that a pull upon the hose will open the faucet and a second pull will close it again; for example, if the cord 33 were attached to the hose 32 in such wise as to admit a little slackness in the hose near the faucet the pull upon the hose would operate to turn on the water and a second pull would operate to turn it off again. In the illustrated embodiment of the invention, however, the cord 33 attached to the ring 27 of the lever 21 runs through an eye 34 secured to the side of the hose near the faucet and thence it runs along the hose to a second eye 35 near the end of the hose. These eyes 34 and 35 merely guide the cord 33 and when it is desired to turn the water on, the operator pulls upon the cord 33, conveniently taking hold of the ball or knob 36 on the end of the cord 33.

This construction is especially adapted and intended for use in connection with the water supply of automobile and carriage wash-stands. The washer may take hold of the end of the hose 32 and bring it to a point upon the car or carriage where he desires to begin his work, then he will pull upon the cord 33 and the water will flow until he turns it off again by pulling a second time upon the cord.

While the invention is particularly intended and adapted for use in connection with washers for automobile and carriage wash-stands, the invention is by no means limited to such use but it may be used in many other places.

What is claimed is:—

A faucet having, in combination, a valve body provided with a plunger for engaging a seat in the valve body, a packing for the plunger, a spring normally pressing the plunger in the direction to close the valve, a ratchet wheel pivoted on the plunger and provided upon its side with a cam, a coöperating cam surface on the valve body, and a lever mounted alongside the ratchet wheel provided with a pawl operating upon successive oscillations to turn the ratchet wheel thereby to cause the cam upon its side alternately to lift the valve from the seat and to permit it to be pressed against the seat by the spring, substantially as described.

SAMUEL G. BROWN.

Witnesses:
 HORACE VAN EVEREN,
 GEORGE E. STEBBINS.

Copies of this patent may be obtained for five cents each, by addressing the "Commissioner of Patents, Washington, D. C."